(12) United States Patent
Rundle et al.

(10) Patent No.: US 10,657,113 B2
(45) Date of Patent: May 19, 2020

(54) LOOSE COUPLING OF METADATA AND ACTUAL DATA

(71) Applicants: Robert Rundle, Albuquerque, NM (US); Nicolaas Pleun Bax, Zuid Holland (NL)

(72) Inventors: Robert Rundle, Albuquerque, NM (US); Nicolaas Pleun Bax, Zuid Holland (NL)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 859 days.

(21) Appl. No.: 14/595,738

(22) Filed: Jan. 13, 2015

(65) Prior Publication Data
US 2015/0205823 A1   Jul. 23, 2015

Related U.S. Application Data

(60) Provisional application No. 61/927,022, filed on Jan. 14, 2014.

(51) Int. Cl.
*G06F 16/21*   (2019.01)
*G06F 16/18*   (2019.01)

(52) U.S. Cl.
CPC ........ *G06F 16/219* (2019.01); *G06F 16/1873* (2019.01)

(58) Field of Classification Search
CPC ......... G06F 17/30286; G06F 17/30008; G06F 17/30309; G06F 17/30595; G06F 8/71; G06F 16/219; G06F 16/1873
USPC ....................................................... 707/695
See application file for complete search history.

(56) References Cited

U.S. PATENT DOCUMENTS

| | | |
|---|---|---|
| 5,680,452 A | 10/1997 | Shanton |
| 6,112,024 A | 8/2000 | Almond et al. |
| 6,154,747 A | 11/2000 | Hunt |
| 6,694,304 B1 | 2/2004 | Sethi |
| 7,209,933 B2 | 4/2007 | Saxena |

(Continued)

FOREIGN PATENT DOCUMENTS

WO   2008103783 A2   8/2008

OTHER PUBLICATIONS

Peckham, et al., "A component-based approach to integrated modeling in the geosciences: The design of CSDMS"; Computers & Geosciences 53 (2013); pp. 3-12.

(Continued)

*Primary Examiner* — Michael Pham
(74) *Attorney, Agent, or Firm* — Cantor Colburn LLP

(57) ABSTRACT

An embodiment of a non-transitory computer-readable storage medium stores instructions which, when processed by a processor, cause the processor to implement a method of storing a data object. The method includes: storing as metadata a globally unique object identifier that identifies the object, and a version table having a relation to the globally unique object identifier, the object representing a data set; and storing the data set in a content table associated with the object, the content table having a relation to the version table, the data set configured to be transmitted from the content table to a node in a distributed network independent from the metadata, the content table including a globally unique content identifier that identifies the data set.

18 Claims, 4 Drawing Sheets

(56) References Cited

U.S. PATENT DOCUMENTS

| | | | |
|---|---|---|---|
| 7,369,279 B2 | 5/2008 | Van Oosterhout | |
| 8,255,373 B2 | 8/2012 | McKelvie et al. | |
| 9,305,033 B2* | 4/2016 | Scheevel | G06F 17/30587 |
| 9,465,877 B2* | 10/2016 | Hunter | G06F 17/30091 |
| 2002/0023180 A1 | 2/2002 | Klimczak et al. | |
| 2002/0177437 A1 | 11/2002 | Chesavage et al. | |
| 2002/0198858 A1 | 12/2002 | Stanley et al. | |
| 2003/0033308 A1* | 2/2003 | Patel | G06F 11/1076 |
| 2003/0135514 A1* | 7/2003 | Patel | G06F 11/1076 |
| 2004/0015514 A1 | 1/2004 | Melton et al. | |
| 2004/0187020 A1 | 9/2004 | Leerssen et al. | |
| 2004/0220979 A1 | 11/2004 | Young et al. | |
| 2004/0236769 A1 | 11/2004 | Smith et al. | |
| 2005/0114672 A1 | 5/2005 | Duncan et al. | |
| 2005/0144198 A1 | 6/2005 | Bergstraesser et al. | |
| 2005/0262107 A1 | 11/2005 | Bergstraesser et al. | |
| 2005/0262165 A1 | 11/2005 | Scott et al. | |
| 2006/0026567 A1 | 2/2006 | McVoy et al. | |
| 2006/0080316 A1 | 4/2006 | Gilmore et al. | |
| 2006/0242655 A1 | 10/2006 | Fernando et al. | |
| 2007/0136382 A1 | 6/2007 | Idicula et al. | |
| 2008/0112006 A1 | 5/2008 | Sambe et al. | |
| 2008/0201339 A1 | 8/2008 | McGrew et al. | |
| 2008/0222212 A1 | 9/2008 | Prasad et al. | |
| 2008/0271047 A1* | 10/2008 | Rafnsson | G06F 17/243 719/311 |
| 2009/0013401 A1 | 1/2009 | Subramanian et al. | |
| 2009/0024609 A1* | 1/2009 | Barker | G06F 21/6227 |
| 2009/0282492 A1 | 11/2009 | Takahashi | |
| 2010/0050272 A1 | 2/2010 | Tadayon et al. | |
| 2010/0228834 A1 | 9/2010 | Hung et al. | |
| 2010/0287208 A1 | 11/2010 | Mao et al. | |
| 2011/0172838 A1 | 7/2011 | Pai et al. | |
| 2011/0225119 A1* | 9/2011 | Wong | G06F 17/30607 707/609 |
| 2012/0089610 A1* | 4/2012 | Agrawal | G06Q 10/00 707/741 |
| 2012/0185435 A1* | 7/2012 | Misra | G06F 16/1873 707/638 |
| 2012/0304306 A1 | 11/2012 | Chamarty et al. | |
| 2013/0159021 A1 | 6/2013 | Felsher | |
| 2014/0136500 A1* | 5/2014 | Wong | G06F 17/30607 707/695 |
| 2014/0189118 A1* | 7/2014 | Hunter | H04L 65/40 709/225 |
| 2014/0351213 A1 | 11/2014 | Rundle et al. | |
| 2015/0205831 A1 | 7/2015 | Rundle et al. | |
| 2015/0205832 A1 | 7/2015 | Rundle et al. | |
| 2015/0205977 A1 | 7/2015 | Rundle et al. | |
| 2015/0242521 A1* | 8/2015 | Hunter | H04L 63/08 726/4 |
| 2016/0179873 A1* | 6/2016 | Scheevel | G06F 17/30587 707/624 |
| 2019/0180045 A1 | 6/2019 | Rundle et al. | |

OTHER PUBLICATIONS

Notification of Transmittal of the International Search Report and the Written Opinion of the International Searching Authority, or the Declaration; PCT/US2015/011322; dated Mar. 20, 2015:, 10 pages.
Notification of Transmittal of the International Search Report and the Written Opinion of the International Searching Authority, or the Declaration; PCT/US2015/011323; dated Mar. 27, 2015, 9 pages.
Notification of Transmittal of the International Search Report and the Written Opinion of the International Searching Authority, or the Declaration; PCT/US2015/011325; dated Mar. 27, 2015: 8 pages.
Notification of Transmittal of the International Search Report and the Written Opinion of the International Searching Authority, or the Declaration; PCT/US2015/011327; dated Mar. 27, 2015; 9 pages.
Leach, et al.; "A Universally Unique IDentifier (UUID) URN Namespace"; The Internet Society (2005); 30 pages.
European Search Report; International Application No. PCT/US2015011325; dated May 31, 2017, pp. 1-10.
R. Lenz, et al.,"A Practical Approach to Process Support in Health Information Systems" Journal of the American Medical Informatics Association, vol. 9, No. 6, Dec. 2002, p. 1-16.
Corwin et al.,"Dynamic Tables: An Architecture for Managing Evolving, Heterogenous Biomedical Data in Relational Database Managment Systems", Dynamic Tables, Application of Infomation Technology, Oct. 5, 2006, p. 1-8.
P. M. Nadkarni, et a."Metadata-Driven Software Systems in Biomedicine", Springer london, 2011, p. 1-20.

* cited by examiner

LOOSE COUPLING OF METADATA AND ACTUAL DATA

CROSS-REFERENCE RELATED TO APPLICATION

This application claims the benefit of an earlier filing date from U.S. Provisional Application Ser. No. 61/927,022 filed Jan. 14, 2014, the entire disclosure of which is incorporated herein by reference.

BACKGROUND

Various processing tools are utilized in relation to energy industry operations and are used to perform tasks including data collection, storage, modelling and analysis. Data from various sources (e.g., measurement and analysis data from various well locations and regions) can be aggregated in a repository for access by numerous users. Object-oriented programming is used to manage data sets, and involves the interaction among a plurality of data objects to implement a computer application.

Some data collection systems are configured as a distributed object system, which includes multiple nodes, each of which is capable of storing a variable amount of object data. Distributed objects may be spread over multiple computers in the system or multiple processors within a computer, and different objects may be managed by different users on different systems. Such distributed object systems might include a large number of nodes which are remotely located relative to one another and connected together in opportunistic ways.

Various conditions can affect the performance of distributed object systems. In some cases, the connection between nodes can be unreliable as a result of intermittent or slow network connectivity. In addition, the topology of the network might also change because of the mobility of any of the nodes. One approach to managing distributed content is to replicate the complete object system to each of nodes in the system, requiring that every node have a full complement of object data.

SUMMARY

An embodiment of a non-transitory computer-readable storage medium stores instructions which, when processed by a processor, cause the processor to implement a method of storing a data object. The method includes: storing as metadata a globally unique object identifier that identifies the object, and a version table having a relation to the globally unique object identifier, the object representing a data set; and storing the data set in a content table associated with the object, the content table having a relation to the version table, the data set configured to be transmitted from the content table to a node in a distributed network independent from the metadata, the content table including a globally unique content identifier that identifies the data set.

An embodiment of a method of storing a data object includes: storing as metadata in a node in a distributed network, by a node processor, a globally unique object identifier that identifies the object, and a version table having a relation to the globally unique object identifier, the object representing a data set; and storing the data set in a content table associated with the object, the content table having a relation to the version table, the data set configured to be transmitted from the content table to a node in the distributed network independent from the metadata, the content table including a globally unique content identifier that identifies the data set.

BRIEF DESCRIPTION OF THE DRAWINGS

Referring now to the drawings wherein like elements are numbered alike in the several Figures.

DETAILED DESCRIPTION

Apparatuses, systems, methods and computer program products are provided for collection, storage and transmission of data. An exemplary apparatus includes a computer program product for execution of a software program that manages data as objects stored in a distributed network. Each object stored in the network includes metadata and a data set for which the object is created (referred to herein as "actual data"). The data set is a set of data (e.g., measurement values) that is represented by the object. The program can be configured to manage any data distributed over a network to which multiple writers have access. For example, the data may be oil and gas or energy industry data, but is not limited thereto.

Energy industry data includes any data or information collected during performance of an energy industry operation, such as surface or subsurface measurement and modeling, reservoir characterization and modeling, formation evaluation (e.g., pore pressure, lithology, fracture identification, etc.), stimulation (e.g., hydraulic fracturing, acid stimulation), drilling, completion and production.

In one embodiment, the metadata is configured to be "loosely" coupled to the actual data. The metadata is relationally coupled to the actual data, but can be independently copied and moved in the database relative to the actual data. The metadata is self-consistent and remains consistent with the actual data as it is transferred between storage locations, without the need to make copies of the actual data. Loose coupling allows for objects and versions thereof to be tracked and allows for simultaneous use and editing of objects by multiple users.

The software and embodiments described herein allow for multiple users at different nodes in the network to write to or otherwise modify objects, track modifications to the objects and synchronize versions of the object so that all users can be alerted to changes in an object from other users, and changes can be made and stored by multiple users without overwriting other users' modifications. As a result, the objects may be edited, simultaneously or in turn, by clients and users that are not in contact with a single server acting as a repository for the objects. As described herein, a "user" refers to a human or processing device capable of accessing and interacting with objects and/or data.

While embodiments are detailed below with specific reference to distributed objects for explanatory purposes, alternate embodiments apply, as well, to other multi-version environments.

Figure 1:
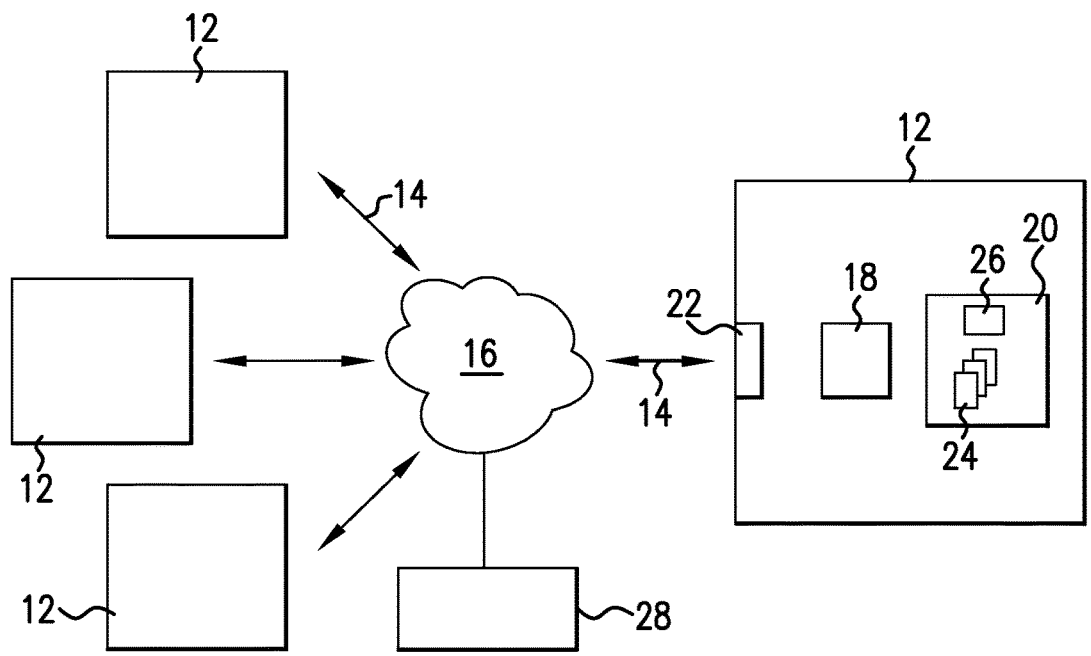
FIG. 1 is a block diagram of an embodiment of a distributed data storage, processing and communication system.

FIG. 1 is a block diagram of a distributed data storage, processing and communication system 10. The system 10 includes a plurality of processing devices or nodes 12. The nodes 12 each have computing components and capabilities, are connected by links 14, which may be wired or wireless. One or more of the nodes 12 may be connected via a network 16, such as the internet or an internal network. Each node 12 is capable of independent processing, and includes suitable components such as a processor 18, memory 20 and input/output interface(s) 22. The memory 20 stores data objects 24 or other data structures, and a program or program suite 26. The nodes may be computing devices of varying size and capabilities such as server machines, desktop computers, laptops, tablets and other mobile devices.

An exemplary program is an energy industry data storage, analysis and/or modeling software program. An example is JewelSuite™ analysis and modeling software by Baker Hughes Incorporated.

In one embodiment, the system includes one or more data storage locations. For example, the system 10 includes a centralized data repository 28. The repository 28 is accessible by each node 12. In one embodiment, the system 10 includes a Distributed Object Network, where each node 12 can access and be used to edit a distributed object, e.g., an object 24. Thus, users can independently retrieve, copy and edit stored data. This independent editing may result in numerous different versions or copies of an object.

In one embodiment, data is stored and managed as objects by one or more nodes (or any other computing and/or storage device connected to the network) configured as a host. One or more nodes 12 are configured as clients to the host and connected to the host via a communication channel. Each client has the ability to retrieve data objects from the host, create and/or edit data objects via a suitable program, and transmit new or modified data objects to the host for storage. The client also includes a client-side cache for storing data from a data object that is received at the client from the host. The client-side cache is a persistent cache that stores the received data until the data is updated or modified, or new data is received that replaces the stored data. The cache is not subject to an arbitrary or pre-determined timer or time limit.

The client is configured to store a data set from a data object in the client-side cache automatically upon receipt of the data set. Each data object is associated with a globally unique identifier (e.g., an object identifier and a version identifier, described further below) that allows both the host and the client to manage and reconcile the states of the objects both client-side and host-side.

The cache holds the stored data set and unique identifier indefinitely, which allows the client to query the host for a data object (e.g., query version information associated with the object identifier), and compare the data object stored in the host with a data object previously stored in the client-side cache. If the objects are exact replicas of each other, the client may retrieve the associated data set directly from the client-side cache, which eliminates the need for redundant transfers of data from the host.

An object is a container for state information and also defines methods and properties that act on that state. An object type is a template that can be used to create an unlimited number of objects, which are initially identical, but become different as the object state changes.

In a distributed object system, some objects are transitory, derivative of other objects, or are otherwise of secondary importance to this discussion. Exemplary objects of interest are objects that map to real world objects, both physical and abstract, and together model the domain of interest. These objects are designated as domain objects. Exemplary domain objects in the oil and gas domain include fields, reservoirs, wells, geological grids, faults, horizons, and fluid contacts.

Examples of domain objects are wells and simulation grids. An example of an object that is not a domain object because of abstraction is a 3D view object that controls the view of an object, such as a subterranean reservoir data object. The state of the 3D view is serialized to an object file so that when the object file is reopened, the view of the reservoir is restored to the same viewing angle and zoom level. However the state of the 3D view object is irrelevant to the real world problem that is being analyzed, and thus this object is not considered a domain object. An example of an object that is not a domain object because of derivation is a well graphics object. The well graphics object implements rendering of a well domain object on the 3D view. The well graphics object contains no state of its own but accesses the state of the well domain object.

In a distributed object system, metadata provides a concise description of the object that can be distributed broadly while the actual data represents the complete object that is often very large and time consuming to move. The metadata is used to identify and/or provide information regarding an object, such as the object type, version, and parameters that the data in the object represents.

An Object Identifier ("Oid") is the globally unique identifier that is used to set each object or domain object apart. When an object or domain object of a particular type is created, a new Oid is generated for it. The Oid may be any suitable type of identifier. An exemplary identifier is a lightweight identifier such as a universally unique identifier (UUID) as specified in RFC 4122.

A Version Identifier ("Vid") is the globally unique identifier that is used to set each version of an object or domain object apart. When an object or domain object of a particular type is created, a new Vid is generated for it, representing the initial, default state of the domain object. As each new version of the domain object is created as a result of self-consistent changes to the state, a new Vid is generated. An exemplary identifier is a lightweight identifier such as a universally unique identifier (UUID) as specified in RFC 4122.

Figure 2:
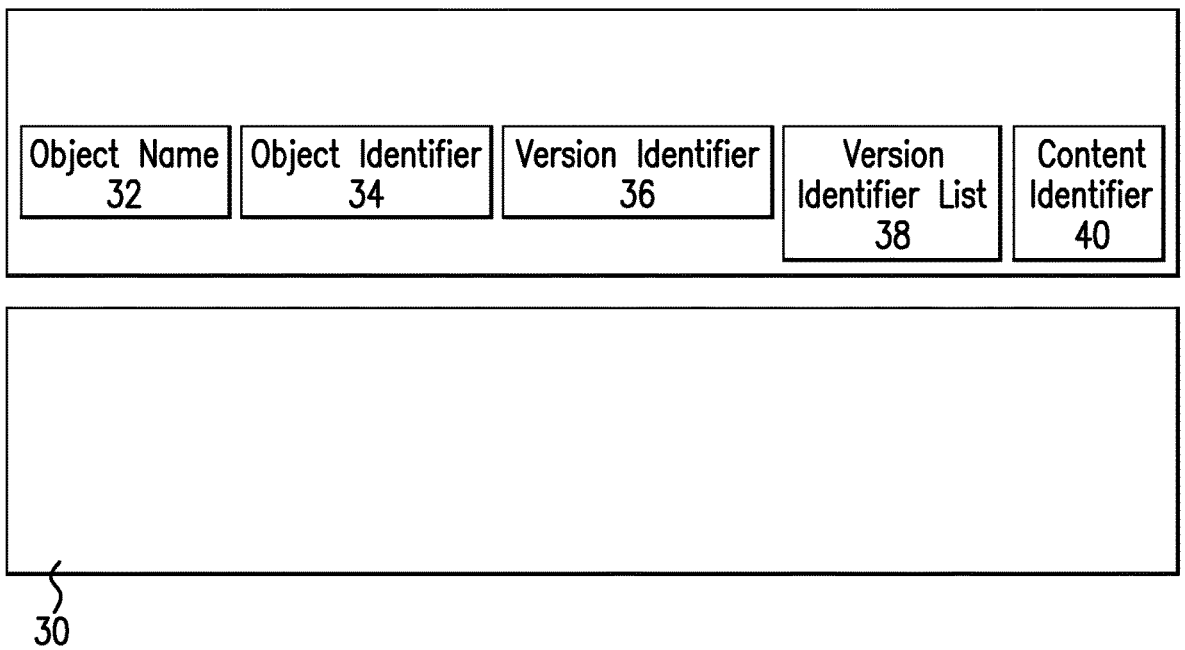
FIG. 2 illustrates identifiers and metadata associated with a data object stored in the system of FIG. 1.

Exemplary metadata that is associated with an object 30 is shown in FIG. 2. Such metadata is described as associated with a domain object, but may also be associated with any object or other data structure. Each object 30 may be imprecisely identified by a tuple (Name, Version Number), where "Name" is the object name 32, which may not be unique to the particular domain object 30, and "Version Number" may also not be unique to the domain object 30. Each object 30 may also be precisely identified by a tuple (Oid, Vid), where Oid 34 is an object identifier and Vid 36 is a version identifier. Each of the identifiers (Oid 34 and Vid 36) is universally unique such that, regardless of which user is editing an object 30, unrelated objects 30 will not have the same Oid 34 and two different edits of the same object 30 will not have the same Vid 36. All objects 30 resulting from the same initial object 30 will have the same Oid 34. However, when one object 30 stems from another, the two objects 30 will have a different Vid 36. Thus, the tuple (Oid, Vid) is unique for each non-identical object 30. The metadata may also include a list of all Vid 36 associated with that object 30, shown in FIG. 2 as a Version identifier List or "VidList" 38. This allows any two object identifiers to be compared to determine the object kinship (e.g., unrelated, identical, ancestor, descendant, or cousin). The metadata may also include a Parent Version Identifier ("ParentVid"), which connects or relates the VidList 38 to each version and associated Vid 36. The ParentVid indicates the previous version of a particular version of an object, i.e., the version of the object that was edited or otherwise use to create the particular version.

As described herein, "metadata" may refer to all data structures associated with an object that are not the actual data that is stored as the object. For example, metadata may refer to the object name, identifier, version identifier and the version identifier list. In other example, metadata may be described separate from the object identifier, such that a representation of an object can include the object identifier, metadata and/or the actual data. The object identifier and/or the metadata can thus be accessed, transmitted and stored independent of the data set while maintaining a relation to the data set.

For each node of the distributed object system, a mechanism is provided to organize the metadata for all objects represented on that node. Examples of this mechanism are described herein.

To effectively manage a large repository of object data, the metadata may be separated from the actual data. As objects become very large and access to the objects is distributed across a large data network, the separate handling of metadata and actual data becomes increasingly important.

In one embodiment, the metadata is loosely coupled to the actual data for an object. "Loose" coupling refers to establishment of a relation between the metadata and the actual data so that metadata can be separately managed and transmitted between nodes while remaining tied to the actual data. This loose coupling is enabled between metadata and actual data and accurately maintained even in the event of changes to either metadata or actual data from multiple sources. The actual data for an object can be stored within the distributed object system and coupled to the metadata such that each can be replicated, synchronized and otherwise moved through the nodes of the distributed object system independent of each other.

In a distributed object system, loose coupling provides the ability for both the metadata and actual data to be replicated across the system according to the various requirements of consumers of system data. The movement and change of objects (including simultaneous changes from different users) can be tracked so as to maximize the storage efficiency and network transfer.

Referring again to FIG. 2, the metadata may include a content identifier 40 that is related to the object identifier 34 and the version identifier 36. The content identifier provides a mechanism to loosely couple the metadata to actual data, allowing the metadata to be distributed separately from the actual data while still tying the metadata to the actual data so that a user can identify the object and all versions of the object. For example, the content identifier 40 is written in a content table or other structure that stores the actual data, and is related to a version table that includes the version identifier 36 and the content identifier 40. Thus, in the system, the object 30 can be represented on each node in one of three ways: as an object identifier, as an object identifier with metadata, or as a complete object including identifier, metadata and actual data. A "content table" as described herein refers to any suitable structure or mechanism for storing the actual data, and is not limited to a table structure or other embodiments described herein.

The Content Identifier ("Cid") is a globally unique identifier that is used to identify actual content of a specific version of an object. This content might be stored in a variety of values. It might be stored as a binary large object (BLOB) in a data base or a file on disk. The content might be stored in a contiguous manner or broken into fragments that are stored separately. The Cid refers to the object actual content as a whole. Moreover the Cid represents a specific and unique location for the object content. If the object content is replicated the new copy of the object content is assigned a new Cid.

The actual data (data set) may be transferred, e.g., from a repository, when needed. Metadata may be used in lieu of the actual data as much as possible. When actual data is needed, the precise version of actual data can be found and transferred. In addition, the actual data can be changed at any of the nodes and the precise relationship of the changed actual data to the original actual data can be preserved without needless replication of the actual data to all nodes.

Figure 3:
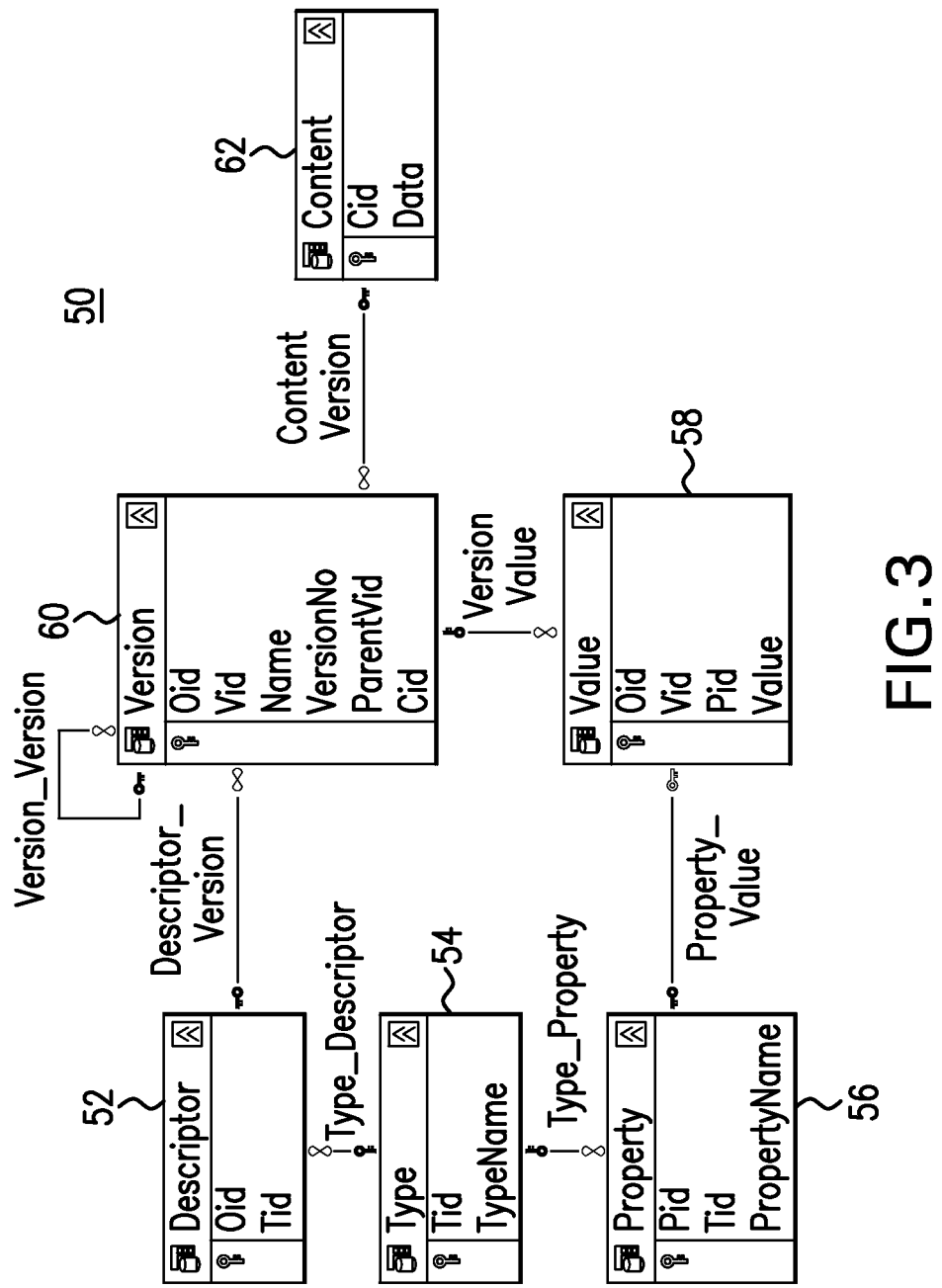
FIG. 3 is a diagram illustrating an embodiment of a data model for storing and organizing identifiers and metadata associated with a data object, and for loosely coupling metadata to actual data of the object.

FIG. 3 shows an example of an organization scheme for metadata that may be applied to oil filed data and other energy industry data. In this example, the data model employs an entity-attribute-value ("EAV") approach, which is extensible in that new or modified domain object definitions can be easily added to an existing repository without redesign or reloading of the data. The organization scheme is not limited to this example. For example, the organization scheme does not need to include an EAV configuration.

Each block in the diagram 50 shown in FIG. 3 represents a relational table, which may be stored in a database or repository and accessible by a node. Each entry in the block represents a column in the table.

A descriptor table 52 (the "entity" of the EAV model) includes an Oid column for storing the unique identifier for an object and a Type identifier ("Tid") column for storing an indication of the object type. A type table 54 includes the Tid and a Type Name column. A Property or parameter table 56 (the "attribute" of the EAV model) includes a Property identifier ("Pid") column, a Tid column and a Property Name column. A Value table 58 includes an Oid column, a Value identifier ("Vid") column for storing the Vid, a Pid column and a Value column for storing the actual property value. A Version table 60 includes Oid, Vid, Name, Version number and ParentVid columns.

The lines between blocks represent one-to-many relations between the rows of one table and the rows of another table. The relations are from parent to child table. A key symbol designates the parent or "one" side of the relation and an infinity symbol designates the child or "many" side of the relation. In other words, a row in the parent table specifies zero or more rows in the child table. As shown, the Descriptor table 52 is a parent of the Version table 60, which is a parent of the Value table 58. The Property table 56 is also a parent of the Value table 58. The Type table 54 is a parent of the Descriptor table 52 and the Property table 56. The Version table 60 is a parent of itself and has a Version_Version relation which couples the ParentVid to the Vid.

The data model represented by diagram 50 includes a Content table 62 having a relation to the Version table 60. The Content table 62 includes a Cid column and a Data column. The Version table 60 also includes a Cid column.

There is a one-to-one relation between the Cid that is the primary key of the Content Table 62 and the Cid column in the Version table 60.

The following table describes each element in the schema of FIG. 3:

| Element | Description |
| --- | --- |
| Descriptor Table | Includes one row for each domain object in the repository. |
| Version Table | Includes one row for each version of a domain object in the repository |
| Type Table | Includes one row for each type of domain object in the repository. |
| Property Table | Includes one row for each property of a domain object type |
| Value Table | Includes the value associated with the property for a specific version of a domain object. |
| Content Table | Includes a row for each version, each row including a Cid and stored data (or a pointer to stored data). |
| Oid Column | The object identifier. Uniquely indicates a domain object. |
| Vid Column | The version identifier. The tuple (Oid, Vid) uniquely identifies a specific version of a domain object. Fully described in [1]. |
| Tid Column | The type identifier. Uniquely indicates a type of domain object. This is a UUID. |
| Pid | The property identifier. Uniquely indicates a property of a type of domain object. This is a UUID. |
| Cid | The content identifier. Uniquely indicates the content of an object or object version. |
| Name Column | The name of the domain object. |
| VersionNo Column | The version number of the domain object. The tuple (Name, VersionNo) is non-unique while tuple (Oid, Vid) is unique. This concept is described in [1]. |
| ParentVid Column | The Vid of the previous version, or empty (null) if the row represents the initial version of the domain object. |
| TypeName Column | The name of the type. |
| PropertyName Column | The name of the property. |
| Value Column | Includes the value for a property for a specific version of a domain object. |
| Data | Stores the actual data for an object or object version. May also point to other storage location(s) of the actual data. |
| Descriptor_Version Relation | Specifies the versions of a domain object. |
| Type_Descriptor Relation | Specifies the domain objects that are of a type. |
| Type_Property Relation | Specifies the properties for a specific type. |
| Property_Value Relation | Specifies the values that are specified for a specific property. |
| Version_Value Relation | Specifies the values that are specified for a specific version of a domain object. |
| Content_Version Relation | Specifies the content that is specified for a specific version of an object. |
| Version_Version Relation | Specifies the previous version of a version of a domain object. |

FIGS. 4-7 illustrate exemplary applications of the content identifier (Cid) and loose coupling embodiments described above. In the following examples, the metadata is organized according to an EAV scheme as described above. However, the loose coupling embodiments may be used with any suitable metadata organization schema, and is not limited to use with the specific types of metadata described herein. In addition, the loose coupling embodiments described herein can be used with any type of data for which object-oriented programming is applicable.

The Data column of the content table 62 is the place where the actual data is stored. The object data might be of varying size and might be very large. The data can be stored using any suitable mechanism, such as BLOBs, disk files and other types of storage. The content for the same object might be stored in different forms in different locations or require data compression or encryption. An attribute of the actual data is that there exists a lossless mechanism for transferring the actual content from one node to another.

For the EAV schema, there are four different representations that can be stored in a node or repository at any given time. The first and most fundamental representation is an empty repository in which entries are only located in the Type and Property tables. These tables describe what might be called the shape of objects in the repository. The Type and Property tables can be replicated in a straight-forward manner between all the nodes in a network or system. This does not mean the Type and Property tables are unchanging over the life of the system. Types and associated properties or parameters can be added at any time and then propagate through the system.

The second representation is a repository including the object identifier (Oid) for an object. In this representation, rows in the Descriptor and Version tables are populated in addition to the Type and Parameter tables.

The third representation is an object identifier with metadata. In this representation the Value table is populated as well as the Descriptor, Version, Type and Parameter or Property tables. The fourth representation is a complete representation of the object, with all six tables being populated.

An example of loose coupling of metadata and actual data is shown in the following tables. In this example, a repository includes data for a single well and a single well log. A Content table is provided for the well log data, a block of data that is potentially 100 megabytes or more. The Content table is related to the Version table, which allows the object identifier and metadata to be transferred without requiring the simultaneous transfer of the actual data (stored in the Content table). The resulting repository appears as so:

| Descriptor Table | |
|---|---|
| Oid Column | Tid Column |
| O1 | T1 |
| O2 | T2 |

| Version Table | | | | | |
|---|---|---|---|---|---|
| Oid Column | Vid Column | Name Column | VersionNo Column | ParentVid Column | Cid Column |
| O1 | V1 | BHJ-10-1 | 1 | (Empty) | |
| O2 | V2 | GR | 1 | (Empty) | C1 |

| Type Table | |
|---|---|
| Tid Column | TypeName Column |
| T1 | Well Type |
| T2 | Log Type |

| Parameter Table | | |
|---|---|---|
| Pid Column | Tid Column | PropertyName Column |
| P1 | T1 | Well Location |
| P2 | T1 | Well Trajectory |
| P3 | T1 | Well State |
| P4 | T2 | Well |
| P5 | T2 | Log Kind |
| P6 | T2 | Log Header |

| Value Table | | | |
|---|---|---|---|
| Oid | Vid | Pid | Value |
| O1 | V1 | P1 | (13942076, −35076495, −40.0) [Northing (ft), Easting (ft), Depth (ft)] |
| O1 | V1 | P2 | ((1247.42, 0.92175.4, 1345.3), (1.13, 201.92), . . .) [MD (ft), Inc (deg), Azi (deg)] |
| O1 | V1 | P3 | (Type: Producer, Phase: Gas, Status: Open) |
| O2 | V2 | P4 | (O1, V1) |
| O2 | V2 | P5 | Gamma Ray |
| O2 | V2 | P6 | (25-Oct-2013 13:03:52, 1309.05-1343.66, 82-230, . . .) [Sample date, depth range (ft), value range (gAPI), . . .] |

| Content Table | |
|---|---|
| Cid | Data |
| C1 | <data values> |

The above tables illustrate an example of use of the metadata schema in accessing and editing objects from a repository or other location or system. In this example, various energy industry or oil and gas data are collected from various operations and locations. Exemplary data includes well information, well log data, survey data and any other measurement data. Analysis data such as models may also be stored in the repository.

For illustrative purposes, the repository is described as having two objects. A well object (identified as O1) includes information regarding a specific well or borehole, such as location, depth, path description, well type (gas, oil, producer, exploration well, etc.) and state (e.g., open, active, closed, etc.). A log object (identified as O2) includes logging data taken via, e.g., a wireline or logging-while-drilling (LWD) operation.

The Type table 54 thus includes two entries to indicate a well object and a log object, and two entries in the Descriptor table 52 (one the well and one for the log). There are corresponding entries in the Version table 60 for the well and the log. Also, a content identifier (C1) is stored in the Version table 60 and associated with the log object. The actual log data is stored in the Content table 62.

For both the well type and the log type, several properties (attributes) are defined. In this example, there are three property entries in the Property table 56 (location, trajectory and state) and three property entries for the log (well, log kind and log header). The Property table thus has six rows. The Value table 58 also has six rows, three rows for each of the single versions of the two domain objects.

Figure 4:
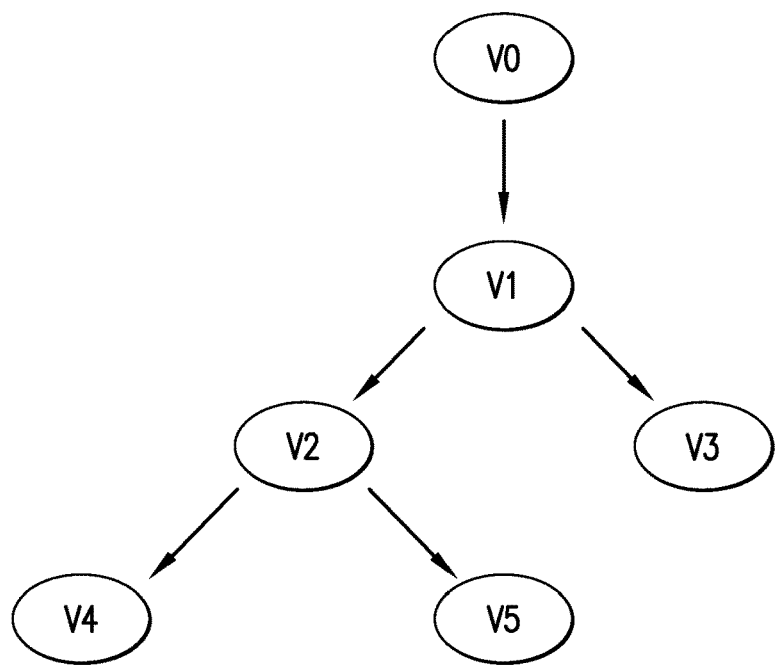
FIG. 4 illustrates exemplary relationships between versions of a data object.

As discussed above, the ParentVid indicates the previous version of a particular version of an object. Because users can independently and potentially simultaneously access and edit data, the versions of an object may not necessarily follow a linear or chronological progression. For example, as shown in FIG. 4, if multiple users access and separately edit and save new versions of an object from the same previous version, the resulting set of versions forms a bifurcating tree of object versions.

The ParentVid, which associates each version with a parent version from which the version was created, allows this tree of object versions to be represented in a flat version table. For example, FIG. 4 illustrates that two users created separate versions (V2 and V3) from a previous version (V1), and two separate versions (V4 and V5) were created from the same previous version V2. Using the ParentVid, the relationships between versions can be represented in a version table as follows:

| Version Table | | | | |
|---|---|---|---|---|
| Oid Column | Vid Column | Name Column | VersionNo Column | ParentVid Column |
| O1 | V0 | Object A | 1 | (Empty) |
| O1 | V1 | Object A | 2 | V0 |
| O1 | V2 | Object A | 3 | V1 |
| O1 | V3 | Object A | 3 | V1 |
| O1 | V4 | Object A | 4 | V2 |
| O1 | V5 | Object A | 4 | V2 |

The corresponding VidList (essentially a path from the root in this example) for each leaf of the tree can be represented as:

$V3=(V0,V1,V3)$ $V4=(V0,V1,V2,V4)$ $V5=(V0,V1,V2,V5)$

Figure 5:
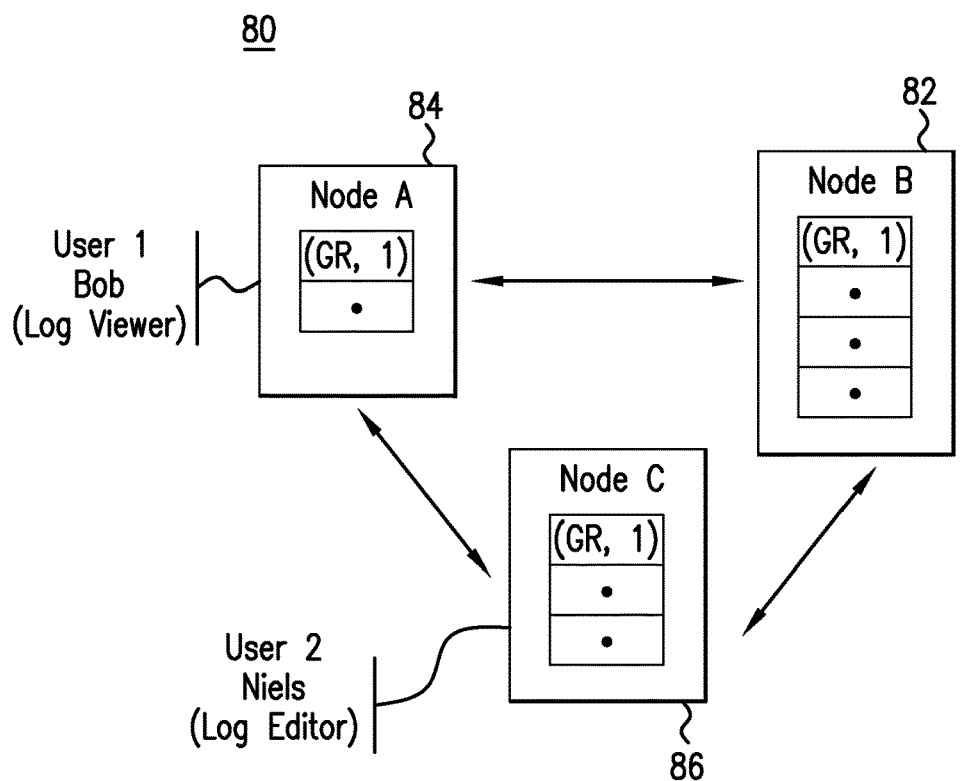
FIG. 5 illustrates a first state of an exemplary distributed computing system including a data repository.
Figure 6:
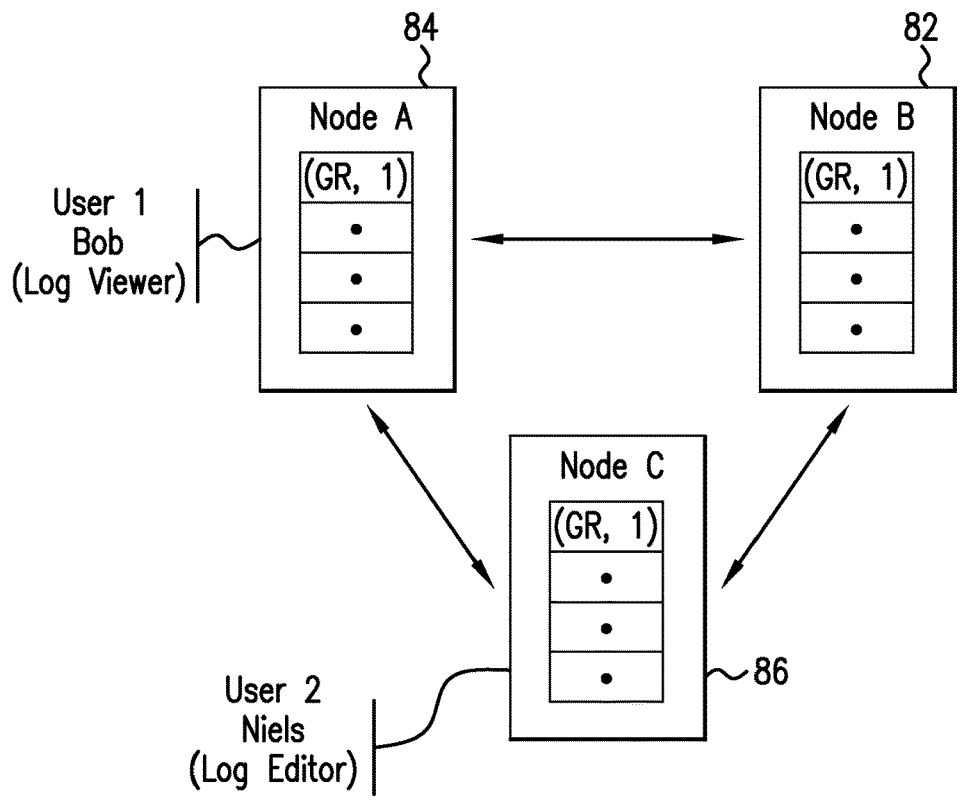
FIG. 6 illustrates a second state of the system of FIG. 5.
Figure 7:
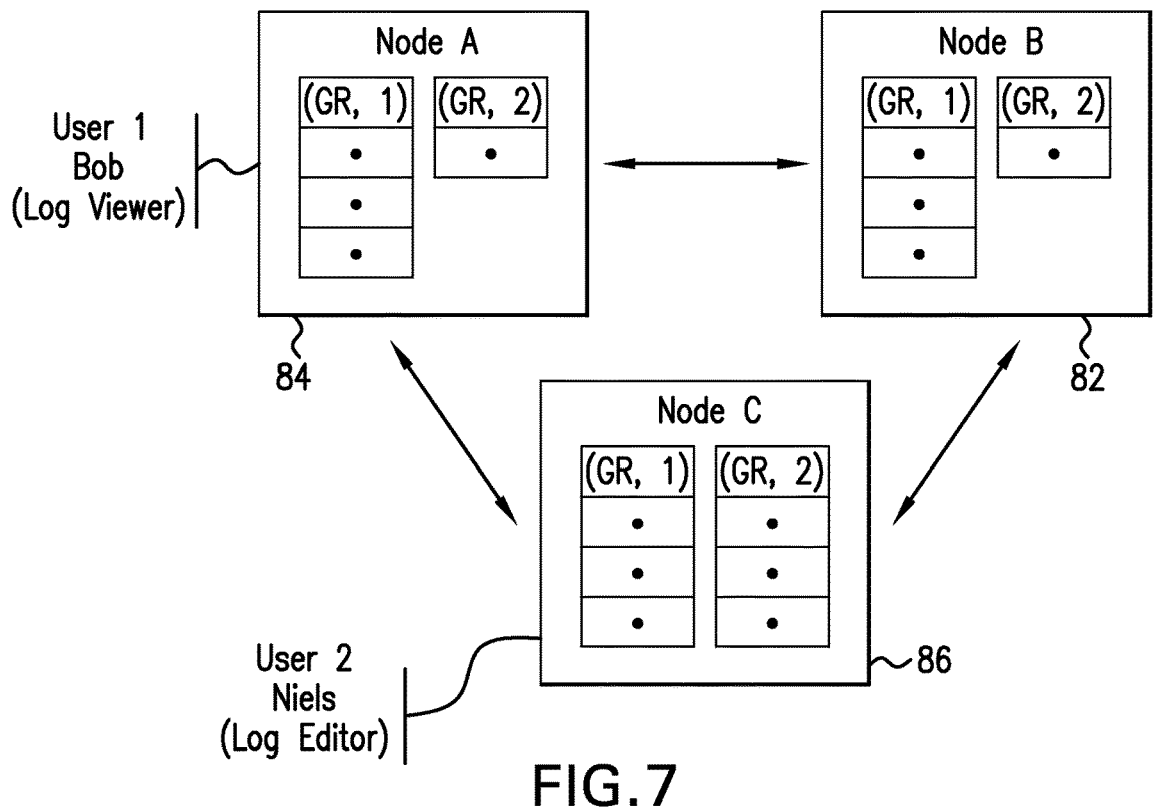
FIG. 7 illustrates a third state of the system of FIG. 5.

FIGS. 5-7 demonstrate the use of such loose coupling and the various representations that can be stored in the system. FIGS. 5-7 show a distributed object system 80 that includes three nodes: an oil and gas data repository 82 ("Node B"), a first client computer 84 ("Node A") used by a first user ("User 1"), and a second client computer 86 ("Node C")

used by a second user ("User 2"). The number and type of data objects, and the number and type of nodes, are not limited to the examples and embodiments described herein.

In this example, a single well log object, "GR", is shown. The well log object GR is represented in a different form on each node for the purpose of illustration. The different forms are indicated by the number of dots in the symbol for the object. One dot indicates an object identifier only, two dots indicates an object identifier and metadata, and three dots indicates that the object identifier, metadata and actual data are stored at the node.

FIG. 5 shows an initial state of the system 80. In the initial state, the repository 82 includes the full object. The full object includes the object identifier, the metadata (including the Type, Property and Value tables) and the actual content (the Content table). Node C has only the object identifier and the metadata, and Node A has only the object identifier. The object representations are labeled (GR, 1) which is in the form of (Name, VersionNo), indicating version 1 of the GR log object.

User 1 elects to view the log, and retrieves the metadata and actual data. User 2, using a log editor, elects to edit the log. Both of these operations require the actual data for the log, which is moved from Node B to Nodes A and C (e.g., to a client-side cache in each node). FIG. 6 shows this state, in which both Nodes A and C retrieve and store the full object. The metadata is transferred prior to transferring the actual data. Nodes A and C now each have an independent copy of the Content table and the reference from the Version table to the Content table. Actual data is transferred in any suitable sequence (e.g., moved first to Node A and then from Node A to Node C or in any of three other sequences). Any suitable mechanism for movement and discovery of metadata and actual data can be used. Each node understands precisely what metadata and actual data is locally available and what needs to be discovered and moved.

User 2 uses a log editor to modify the actual data in Node C, resulting in the state shown in FIG. 7. The effect of modifying the log is a new version of the log object on Node C, noted as (GR, 2) with a new set of metadata and version data. The other nodes in the distributed object system are notified of the change through a replication of the object identification only. User 1 is notified of the change by User 2. If User 1 requests the new version, the metadata for version 2 is transferred to Node A, and the actual data for version 2 is transferred thereafter.

This approach is always capable of properly coupling the actual data to metadata and object identification. The example shows only a single writer scenario, but the approach also works with multiple, simultaneous writers. For example, if User 1 were also using a log editor and modified the GR log at precisely the same time as User 2, version 2 of the log would be created on Node A. On the surface, this appears to be a collision because there are now two incompatible (GR, 2) logs. However, the system is not fooled by these apparent collisions. As discussed above, the (Name, VersionNo) identity is non-unique while the (Oid, Vid) identifier is unique. Therefore the two (GR, 2) well logs would be properly identified as cousin objects and separately notified and handled throughout the distributed object system. This identification can be achieved using a baseline, which is a snapshot or reference list of objects at a given time. The baseline and object identification process is described in U.S. Publication No. 2014/0351213, published Nov. 27, 2014 (application Ser. No. 13/898,762 filed May 21, 2013), the contents of which are incorporated herein by reference in its entirety.

This approach is also not dependent on the communication or connection between nodes. Should the communications links be severed between all the nodes in the example network, user action might be impacted depending on moment at which this outage occurred. User 2 might not be able to get the actual data from Node A to edit, or User 1 might not be notified that User 2 has made a change to the well log. Nonetheless, the system recovers immediately once communication is restored and is otherwise unaffected by communication outages.

The embodiments described herein provide numerous advantages. Embodiments described herein allow for tracking and management of both the movement and change of objects so as to maximize the storage efficiency and network transfer, which cannot be effectively realized in prior art systems.

A distributed object system consists of multiple nodes, each of which is capable of storing a variable amount of object data. The connection between nodes might be unreliable as a result of intermittent or slow network connectivity. The topology of the network might also change because of the mobility of any of the nodes.

One prior art approach is to replicate the complete object system to each of nodes in the system, which is highly inefficient as it is unlikely that every node requires a full complement of object data. This approach also does not take into account the varying capacities of each node nor the throughput between nodes. Finally this approach is only straightforward when objects are unchanging or at least change only in a single location in well-defined ways. As soon as objects are permitted to change in multiple locations and simultaneously this approach is completely unworkable.

The embodiments described herein solve the problems that the straightforward approach does not. The loose coupling of metadata and actual data as described here enables a number of important scenarios in a distributed object system, including scenarios where multiple writers modify or edit an object separately and/or simultaneously. The embodiments described herein work in all situations even with multiple writers or disconnected nodes.

The embodiments described herein are highly efficient because actual data, which might be burdensome to store and time consuming to move, is only moved to different locations in the distributed object system when necessary. At the same time, changes to objects are broadcast throughout the system. It can be said about this approach that changes to object versioning and metadata are pushed, while changes to actual data are pulled and this distinction makes this approach different than all existing systems.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A non-transitory computer-readable storage medium storing instructions which, when processed by a processor, cause the processor to implement a method of storing a data object, the method comprising:
storing as metadata a globally unique object identifier that identifies the data object, and a version table having a relation to the globally unique object identifier, the data object representing a data set, the version table including a version identifier, the version identifier being a globally unique identifier that is used to set each version of an object apart;
storing the data set in a content table associated with the data object, the content table having a child relation to the version table, the data set configured to be transmitted from the content table to a node in a distributed network independent from the metadata, the content table including a globally unique content identifier that identifies the data set; and
transmitting, between the node and at least one additional node in the distributed network, the metadata independent of the data object while maintaining a relation to the data set to enable tracking movement and change of the data object to maximize storage efficient and network transfer, wherein the metadata is rationally coupled to the data object,
wherein the metadata is organized according to an extensible entity-attribute-value ("EAV") model, the entity of the extensible EAV model being represented by a descriptor table storing the globally unique object identifier that identifies the data object and a type identifier, the attribute of the EAV model being represented by a property table storing the type identifier and a property identifier, and the value of the EAV model being represented by a value table being separate from and in a child relation to the property table and being separate from and in a child relation to the version table, the value table storing the globally unique object identifier, the property identifier, and a value.

2. The storage medium of claim 1, wherein the metadata is configured to be stored independent of the data object.

3. The storage medium of claim 1, wherein the globally unique object identifier is stored in the descriptor table having a parent relation to the version table, and the content table has a one-to-one relation to the version table.

4. The storage medium of claim 1, wherein the method further comprises generating a globally unique initial version identifier representing an initial state of the data object, and generating a new version identifier in response to a new version of the data object being created.

5. The storage medium of claim 1, wherein the globally unique object identifier in combination with the version identifier precisely identifies a particular version of the data object.

6. The storage medium of claim 1, wherein the globally unique object identifier and the version table are configured to be stored together in a node or independently in the node.

7. The storage medium of claim 1, wherein the data object is represented in the node by one of: the globally unique object identifier, the globally unique object identifier in combination with additional metadata, or the globally unique object identifier in combination with the additional metadata and the data set.

8. The storage medium of claim 1, wherein the data set includes data acquired in conjunction with an energy industry operation.

9. The storage medium of claim 1, wherein the data set and the metadata are stored in a data repository accessible by a plurality of nodes in the network, and the metadata is configured to be transferred to a node by a user without requiring transfer of the data set.

10. A method of storing a data object, the method comprising:
storing as metadata in a node in a distributed network, by a node processor, a globally unique object identifier that identifies the data object, and a version table having a relation to the globally unique object identifier, the data object representing a data set, the version table including a version identifier, the version identifier being a globally unique identifier that is used to set each version of an object apart;
storing the data set in a content table associated with the data object, the content table having a child relation to the version table, the data set configured to be transmitted from the content table to a node in the distributed network independent from the metadata, the content table including a globally unique content identifier that identifies the data set; and
transmitting, between the node and at least one additional node in the distributed network, the metadata independent of the data object while maintaining a relation to the data set to enable tracking movement and change of the data object to maximize storage efficient and network transfer, wherein the metadata is rationally coupled to the data object,
wherein the metadata is organized according to an extensible entity-attribute-value ("EAV") model, the entity of the extensible EAV model being represented by a descriptor table storing the globally unique object identifier that identifies the data object and a type identifier, the attribute of the EAV model being represented by a property table storing the type identifier and a property identifier, and the value of the EAV model being represented by a value table being separate from and in a child relation to the property table and being separate from and in a child relation to the version table, the value table storing the globally unique object identifier, the property identifier, and a value.

11. The method of claim 10, wherein the metadata is configured to be stored independent of the data object.

12. The method of claim 10, wherein the globally unique object identifier is stored in the descriptor table having a parent relation to the version table, and the content table has a one-to-one relation to the version table.

13. The method of claim 10, further comprising generating a globally unique initial version identifier representing an initial state of the data object, and generating a new version identifier in response to a new version of the data object being created.

14. The method of claim 10, wherein the globally unique object identifier in combination with the version identifier precisely identifies a particular version of the data object.

15. The method of claim 10, wherein the globally unique object identifier and the version table are configured to be stored together in a node or independently in the node.

16. The method of claim 10, wherein the data object is represented in the node by one of: the globally unique object identifier, the globally unique object identifier in combination with additional metadata, or the globally unique object identifier in combination with the additional metadata and the data set.

17. The method of claim 10, wherein the data set includes data acquired in conjunction with an energy industry operation.

18. The method of claim 10, wherein at least one of the metadata, the content table and the data set are stored in at least one of: one or more nodes in the distributed network, and a data repository accessible by the one or more nodes.

* * * * *